United States Patent
Young et al.

(10) Patent No.: US 8,012,001 B2
(45) Date of Patent: Sep. 6, 2011

(54) METHODS AND SYSTEMS FOR INCREASING PROTEIN FOOD SAFETY

(75) Inventors: Joseph D. Young, Olathe, KS (US); Marcel J. Sarzen, Dunwoody, GA (US); Patrick D. Mies, Overland Park, KS (US)

(73) Assignee: Ivy Animal Health, Inc., Overland Park, KS (US)

( * ) Notice: Subject to any disclaimer, the term of this patent is extended or adjusted under 35 U.S.C. 154(b) by 234 days.

(21) Appl. No.: 12/490,927

(22) Filed: Jun. 24, 2009

(65) Prior Publication Data

US 2009/0327280 A1 Dec. 31, 2009

Related U.S. Application Data (60) Provisional application No. 61/075,635, filed on Jun. 25, 2008.

(51) Int. Cl.
  *A22C 18/00* (2006.01)
(52) U.S. Cl. ........................................................ 452/150
(58) Field of Classification Search ................ 452/1, 12, 452/52, 53, 106, 125, 149, 150, 173, 198
See application file for complete search history.

(56) References Cited

U.S. PATENT DOCUMENTS

| | | | | |
|---|---|---|---|---|
| 5,945,152 A | * | 8/1999 | Purser | 426/646 |
| 5,965,188 A | * | 10/1999 | Bland et al. | 426/532 |
| 6,172,040 B1 | * | 1/2001 | Naidu | 426/326 |
| 7,375,080 B1 | * | 5/2008 | Naidu | 514/2.5 |
| 2002/0135760 A1 | | 9/2002 | Poole | |
| 2004/1770011 | | 9/2004 | Ramsay et al. | |
| 2006/0008866 A1 | | 1/2006 | Flick et al. | |
| 2007/0062206 A1 | | 3/2007 | Brock et al. | |

FOREIGN PATENT DOCUMENTS

JP 20025920 A 9/2002

OTHER PUBLICATIONS

International Search Report and Written Opinion issued in related PCT Patent Application PCT/US09/48464, dated Aug. 6, 2009, 8 pages.
Response to Written Opinion filed in related PCT Patent Application PCT/US09/48464, dated Nov. 11, 2009, 21 pages.

* cited by examiner

*Primary Examiner* — Thomas Price
(74) *Attorney, Agent, or Firm* — Lathrop & Gage LLP (57) ABSTRACT

Methods, systems, and devices for increasing protein food safety are provided. According to one embodiment, a method in a computer system for increasing protein food safety includes steps: (a) receiving contamination level data; (b) accessing from a database stored data comprising prior contamination level data, prior interventions associated with the prior contamination level data, and prior actual results associated with the prior contamination level data; (c) selecting a subset of the prior contamination level data, the prior interventions, and the prior actual results, where the prior contamination level data is similar to the contamination level data; (d) determining if an effective intervention is set forth in the subset based at least partially on the prior actual results in the subset; and (e) if an effective intervention is not set forth in the subset, causing an intervention to be output that is increased relative to the intervention in the subset.

20 Claims, 9 Drawing Sheets

METHODS AND SYSTEMS FOR INCREASING PROTEIN FOOD SAFETY

CROSS-REFERENCE TO RELATED APPLICATIONS

This application is related to and claims the benefit of pending U.S. Provisional Patent Application No. 61/075,635, filed on Jun. 25, 2008 and entitled "Methods And Systems For Increasing Protein Food Safety", the entire contents of which are incorporated herein by reference.

BACKGROUND

The supply chain for food, and especially for protein (i.e., live animals and meat) sources (e.g., beef, poultry, pork, sheep, and goats), is complex. Pathogens may be introduced or multiply along the supply chain, which can render the protein unsafe for consumption.

Figure 1:
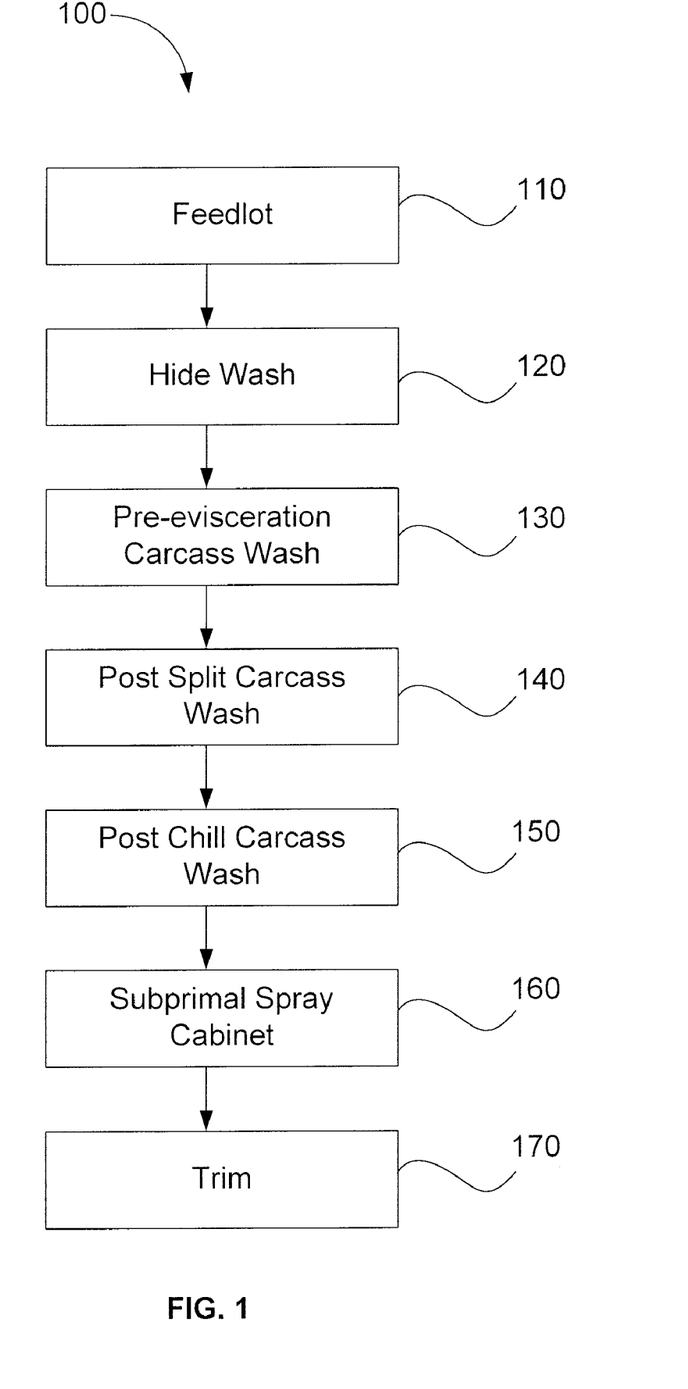
FIG. 1 is flow chart representing a portion of a beef supply chain.

To detect harmful levels of pathogens before protein is sold to consumers, contamination levels (i.e., pathogen levels and/or levels of indicator organisms that indicate contamination) are typically measured at one point in the supply chain after the protein has been aggregated. For example, it is currently standard practice in the beef industry to measure pathogen levels when beef is trimmed (which is after the beef has been aggregated in a feed yard). The data from the trim point is used by regulators to determine beef safety, operational well-being, and national averages. As shown in FIG. 1, there can be many points (e.g., feedlot 110, hide wash 120, pre-evisceration carcass wash 130, post split carcass wash 140, post chill carcass wash 150, and subprimal spray cabinet 160) in portion 100 of a beef supply chain before trim point 170. And current practice in the beef industry involves randomly sampling the beef at the trim point 170, instead of testing all of the protein at all points.

Methods, devices, and systems for increasing protein food safety are provided herein.

SUMMARY

A method in a computer system for increasing protein food safety according to one embodiment includes the steps of: (a) receiving at least one of contamination level data and external indicator data; (b) accessing from a database stored data comprising prior contamination level data, prior external indicator data, prior interventions associated with the prior contamination level data and the prior external indicator data, and prior actual results associated with the prior contamination level data and the prior external indicator data; (c) selecting a subset of the prior contamination level data, the prior external indicator data, the prior interventions, and the prior actual results, where the prior contamination level data and the prior external indicator data is similar to the at least one of contamination level data and external indicator data; (d) determining if an effective intervention is set forth in the subset based at least partially on the prior actual results in the subset; and (e) if an effective intervention is not set forth in the subset, causing an intervention to be output that is increased relative to the intervention in the subset.

A method in a computer system for increasing protein food safety according to another embodiment includes the steps of: (a) receiving contamination level data; (b) accessing from a database stored data comprising prior contamination level data, prior interventions associated with the prior contamination level data, and prior actual results associated with the prior contamination level data; (c) selecting a subset of the prior contamination level data, the prior interventions, and the prior actual results, where the prior contamination level data is similar to the contamination level data; (d) determining if an effective intervention is set forth in the subset based at least partially on the prior actual results in the subset; and (e) if an effective intervention is not set forth in the subset, causing an intervention to be output that is increased relative to the intervention in the subset.

A method in a computer system for increasing protein food safety according to still another embodiment includes the steps of: (a) receiving external indicator data; (b) accessing from a database stored data comprising prior external indicator data, prior interventions associated with the prior external indicator data, and prior actual results associated with the prior external indicator data; (c) selecting a subset of the prior external indicator data, the prior interventions, and the prior actual results, where the prior external indicator data is similar to the external indicator data; (d) determining if an effective intervention is set forth in the subset based at least partially on the prior actual results in the subset; and (e) if an effective intervention is not set forth in the subset, causing an intervention to be output that is increased relative to the intervention in the subset.

In yet another embodiment, a program storage device is provided that is readable by a machine and tangibly embodies a program of instructions executable by the machine to perform method steps for increasing protein food safety. The method steps include: (a) receiving contamination level data; (b) accessing from a database stored data comprising prior contamination level data, prior interventions associated with the prior contamination level data, and prior actual results associated with the prior contamination level data; (c) selecting a subset of the prior contamination level data, the prior interventions, and the prior actual results, where the prior contamination level data is similar to the contamination level data; (d) determining if an effective intervention is set forth in the subset based at least partially on the prior actual results in the subset; and (e) if an effective intervention is not set forth in the subset, causing an intervention to be output that is increased relative to the intervention in the subset.

In still yet another embodiment, a program storage device is provided that is readable by a machine and tangibly embodies a program of instructions executable by the machine to perform method steps for increasing protein food safety. The method steps include: (a) receiving external indicator data; (b) accessing from a database stored data comprising prior external indicator data, prior interventions associated with the prior external indicator data, and prior actual results associated with the prior external indicator data; (c) selecting a subset of the prior external indicator data, the prior interventions, and the prior actual results, where the prior external indicator data is similar to the external indicator data; (d) determining if an effective intervention is set forth in the subset based at least partially on the prior actual results in the subset; and (e) if an effective intervention is not set forth in the subset, causing an intervention to be output that is increased relative to the intervention in the subset.

DETAILED DESCRIPTION

Various technical terms are used throughout this description. These definitions are intended to provide a clearer understanding of the current disclosure but are in no way intended to limit the scope of the present invention. The definitions and terms should be interpreted broadly and liberally to the extent allowed the meaning of the words.

As one skilled in the art will appreciate, the present invention may be embodied as, among other things: a method, system, or computer-program product. Accordingly, the present invention may take the form of a hardware embodiment, a software embodiment, or an embodiment combining software and hardware. In a preferred embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Figure 2A:
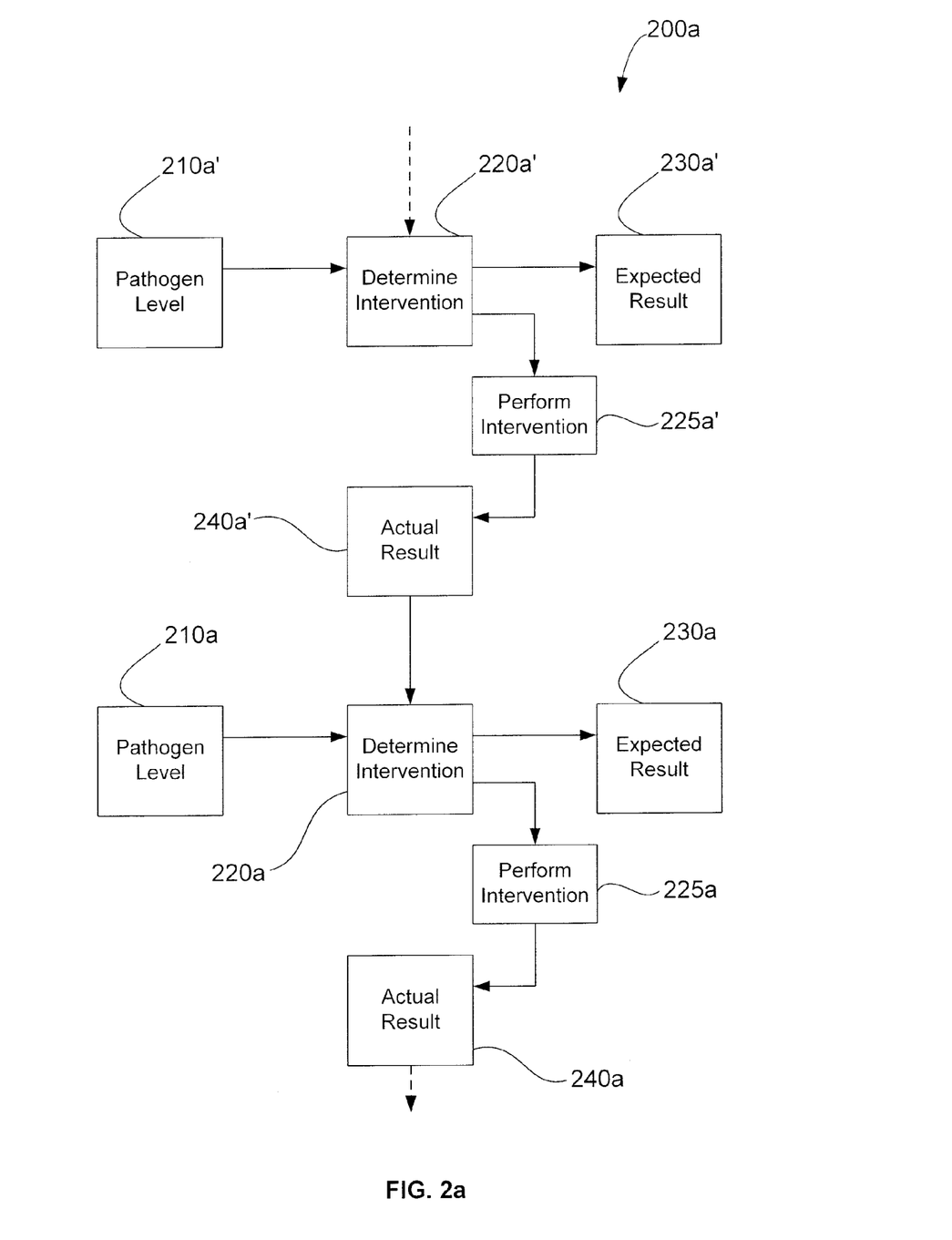
FIGS. 2a through 2d are block diagrams of methods for improving protein food safety according to different embodiments.

FIG. 2a shows one inventive method 200a of improving protein food safety. According to the method 200a, contamination levels (i.e., pathogen levels and/or levels of indicator organisms that indicate contamination) 210a are measured throughout the supply chain, and at least between the points of aggregation and retail to consumers. At least for each point in the supply chain that a contamination level 210a is measured, an intervention 220a may be selected for the particular protein item and administered (denoted by reference number 225a). An expected result 230a (i.e., an expected condition of a particular protein item after the intervention 220a) is predicted, and an actual result 240a (i.e., an actual result for a particular protein item after the intervention 220a) is tracked. "Intervention" is used in this document to denote one or more biological, pharmaceutical, and/or other health-promoting substance, and the amount of such a substance. The amount of all such substances may be zero, or in other words, the decision to forego such a substance (i.e., the act of not providing any such substance) may nevertheless be referred to herein as an "intervention."

Actual results 240a' from previous protein items (and particularly their relation to expected results 230a') may be considered along with (or instead of) a protein item's specific contamination level 210a to select the intervention 220a, and the actual result 240a (and particularly its relation to expected results 230a) for a protein item may be considered when selecting the intervention 220a for future protein items. In FIG. 2a, a previous protein item has a pathogen level denoted 210a', an intervention denoted 220a', an expected result denoted 230a', and an actual result denoted 240a'. It should be understood that, while a single previous actual result 240a' is shown in FIG. 2a, numerous previous actual results 240a' may in practice be used. The previous actual results 240a' may be obtained across plants, companies, brands, areas, etc. Further details regarding the selection of the intervention 220a are set forth below.

Figure 2B:
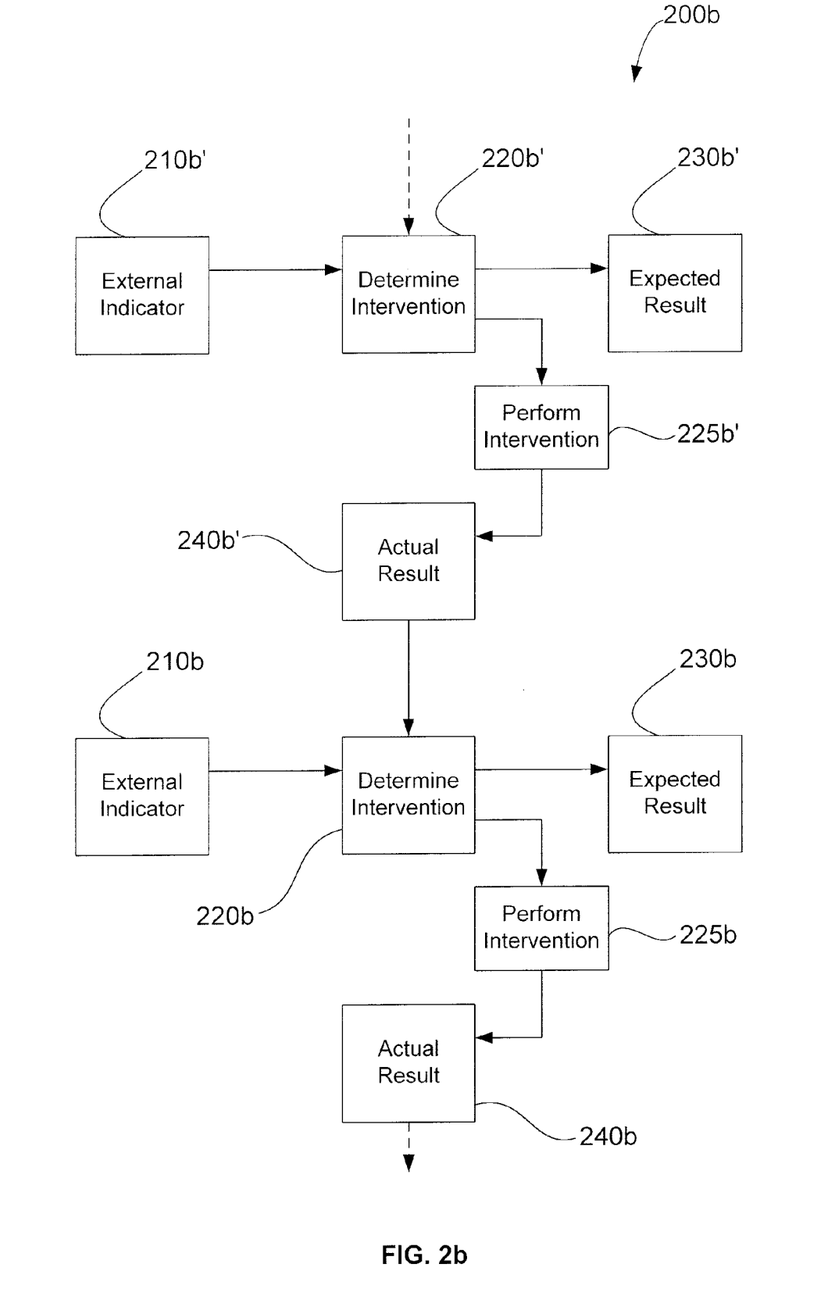

FIG. 2b shows another inventive method 200b of improving protein food safety. According to the method 200b, external indicators (e.g., employee absenteeism, weather patterns/events, lairage time, distance from supplier to plant, chain speed, number of microbial interventions, temperatures, cattle type, employee training programs, mud scores, seasonality, feedyard size, pen size, feedyard ration, wet/dry distiller's grain content in ration, cattle time on feed, carcass/live weight, cattle performance attributes, carcass grade/yield, etc.) 210b are determined throughout the supply chain, and at least between the points of aggregation and retail to consumers. At least for each point in the supply chain that at least one external indicator 210b is determined, an intervention 220b may be selected for the particular protein item and administered (denoted by reference number 225b). Intervention 220b may be the same or different than intervention 220a (FIG. 2a). An expected result 230b (i.e., an expected condition of a particular protein item after the intervention 220b) is predicted, and an actual result 240b (i.e., an actual result for a particular protein item after the intervention 220b) is tracked.

Actual results 240b' from previous protein items (and particularly their relation to expected results 230b') may be considered along with (or instead of) external indicators 210b to select the intervention 220b, and the actual result 240b (and particularly its relation to expected results 230b) for a protein item may be considered when selecting the intervention 220b for future protein items. In FIG. 2b, a previous protein item has external indicators denoted 210b', an intervention denoted 220b', an expected result denoted 230b', and an actual result denoted 240b'. It should be understood that, while a single previous actual result 240b' is shown in FIG. 2a, numerous previous actual results 240b' may in practice be used. The previous actual results 240b' may be obtained across plants, companies, brands, areas, etc. Further details regarding the selection of the intervention 220b are set forth below.

Figure 2C:
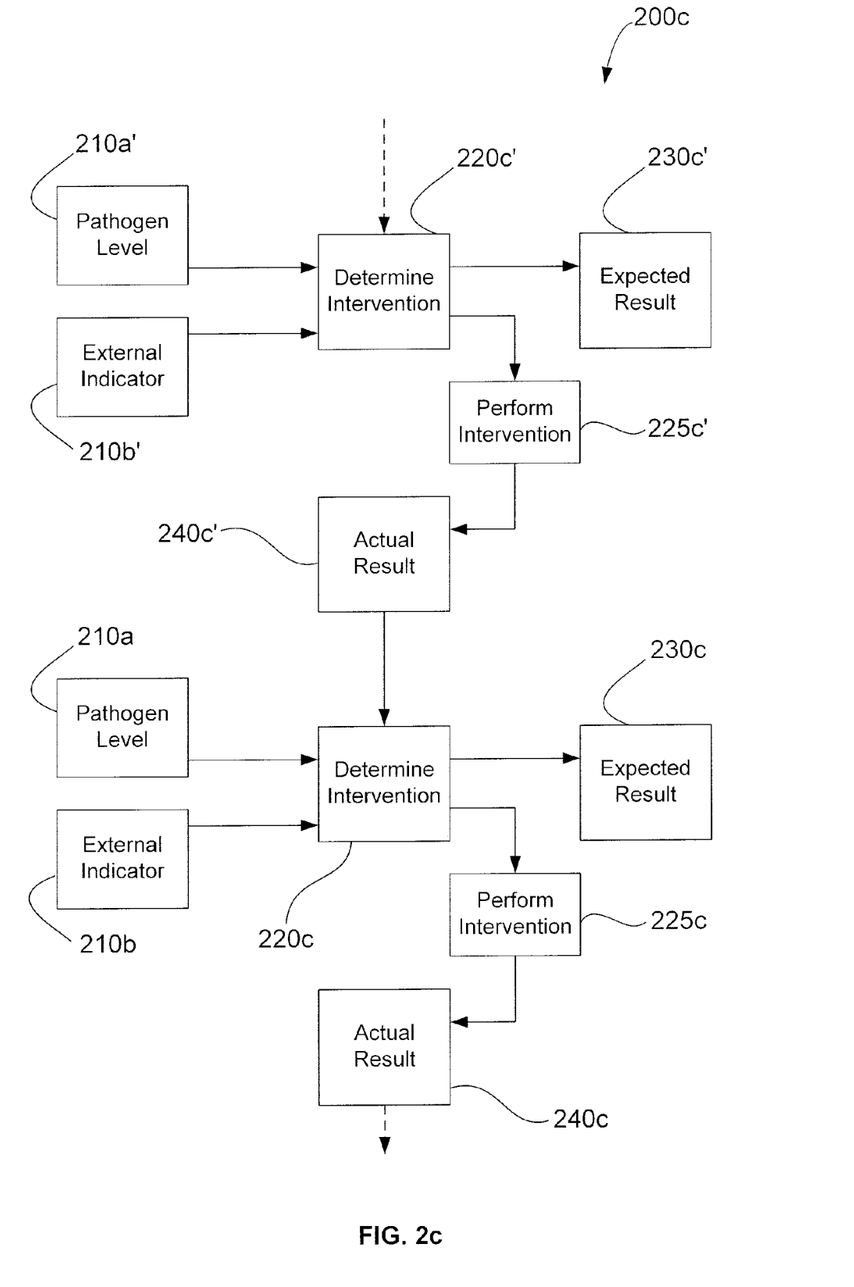

FIG. 2c shows still another inventive method 200c of improving protein food safety. According to the method 200c, both contamination levels 210a and external indicators 210b may be determined throughout the supply chain, and at least between the points of aggregation and retail to consumers. At least for each point in the supply chain that at least one contamination level 210a is measured or at least one external indicator 210b is determined, an intervention 220c may be selected for the particular protein item and administered (denoted by reference number 225c). Intervention 220c may be the same or different than interventions 220a, 220b (FIG. 2a and FIG. 2b), and further details regarding the selection of the intervention 220c are set forth below. An expected result 230c (i.e., an expected condition of a particular protein item after the intervention 220c) is predicted, and an actual result 240c (i.e., an actual result for a particular protein item after the intervention 220c) is tracked.

Actual results 240c' from previous protein items (and particularly their relation to expected results 230c') may be considered along with (or instead of) a protein item's specific contamination level 210a and/or external indicators 210b to select the intervention 220c, and the actual result 240c (and particularly its relation to expected result 230c) for a protein item may be considered when selecting the intervention 220c for future protein items. In FIG. 2c, a previous protein item has a pathogen level denoted 210a', external indicators denoted 210b', an intervention denoted 220c', an expected result denoted 230c', and an actual result denoted 240c'. It should be understood that, while a single previous actual result 240c' is shown in FIG. 2c, numerous previous actual results 240c' may in practice be used. The previous actual results 240c' may be obtained across plants, companies, brands, areas, etc. Further details regarding the selection of the intervention 220c are set forth below.

Figure 2D:
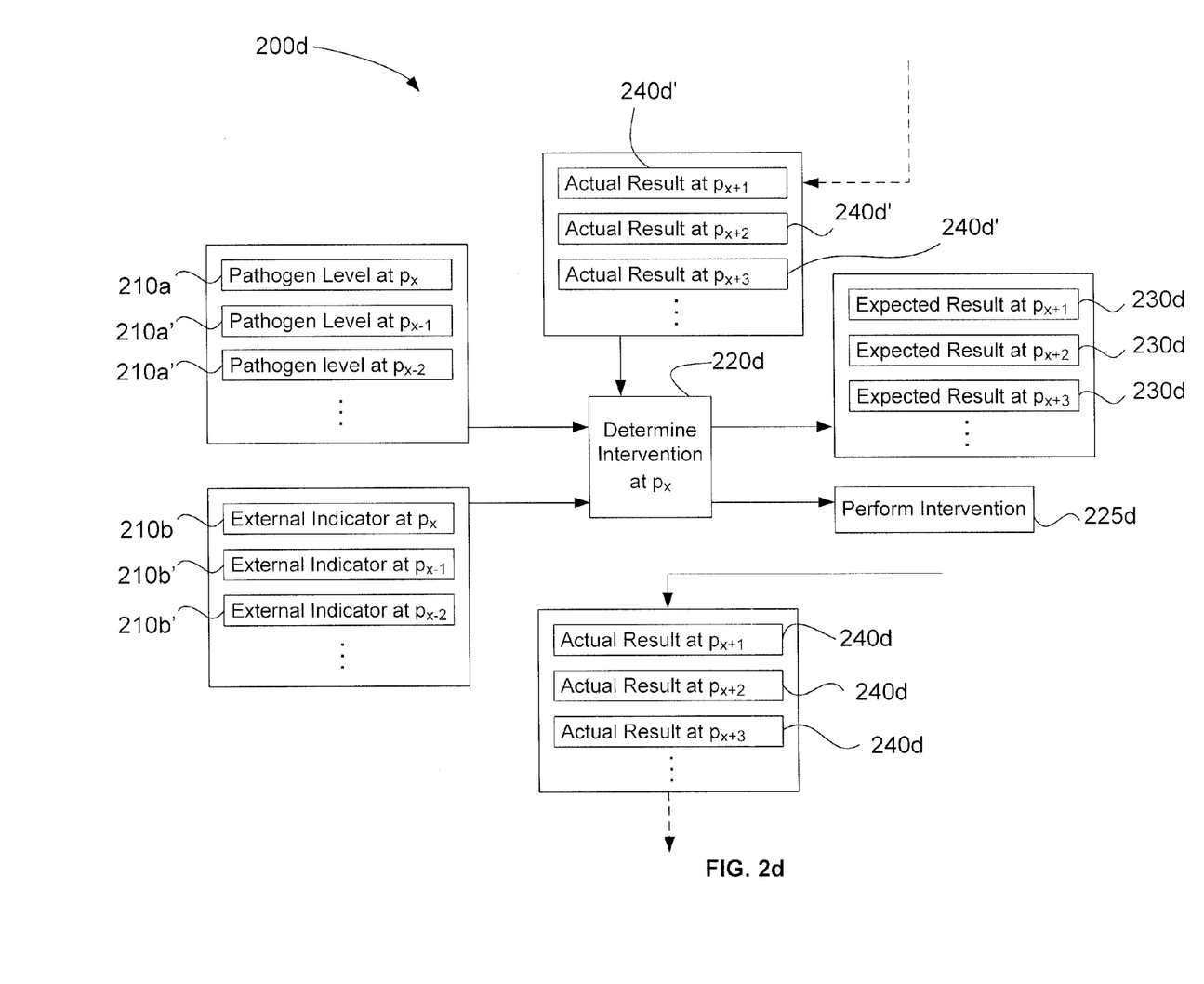

FIG. 2d shows still yet another inventive method 200d of improving protein food safety. According to the method 200d, both contamination levels 210a and external indicators 210b may be determined throughout the supply chain, and at least between the points of aggregation and retail to consumers, similar to method 200c. In addition, previous contamination levels 210a' and previous external indicators 210b' for the protein item at earlier points along the supply chain and actual results 240d' for previous protein items (and particularly their relation to expected results) may be used to select the intervention 220d for the protein item. Further, expected results 230d at various future points on the supply chain may be predicted, and actual results 240d (and particularly their relation to expected results 230d) may be considered when selecting the intervention 220d for future protein items. From this description, it should be clear to one of ordinary skill in the art that method 200d provides the ability to focus on multiple points along the supply chain when determining the intervention 220d.

In FIG. 2d, the protein item has previous pathogen levels denoted 210a' and previous external indicators denoted 210b', and a previous protein item has actual results denoted 240d'. The previous actual results 240d' may be obtained across plants, companies, brands, areas, etc. Further details regarding the selection of the intervention 220d are set forth below.

It may be preferable to utilize method 200a, 200b, 200c, or 200d at a majority of points (or even every point) in the protein supply chain, and it may be preferable to sample every protein item instead of randomly sampling protein items. Nevertheless, due to cost and/or timing, it may be advantageous to randomly sample protein items at various points in the protein supply chain and to sample every protein item at other points in the protein supply chain.

Figure 3A:
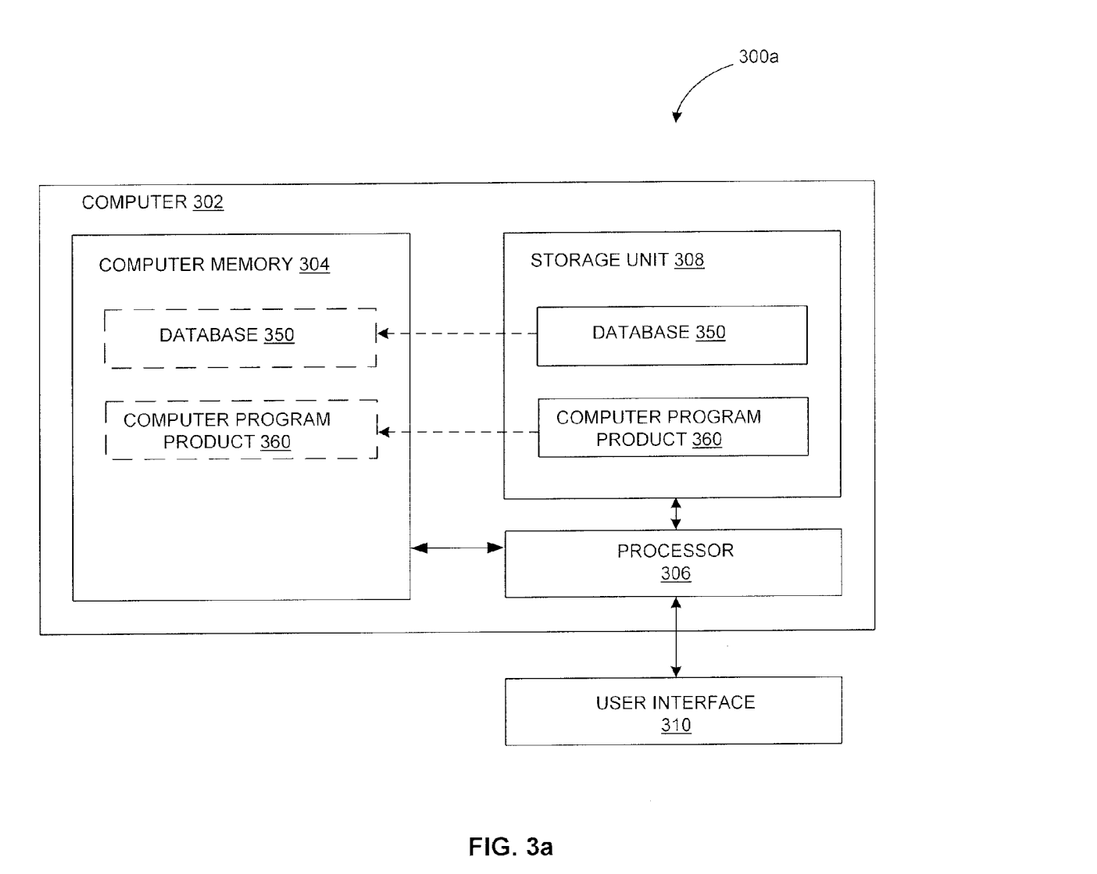
FIGS. 3a and 3b show exemplary systems for determining an intervention.
Figure 3B:
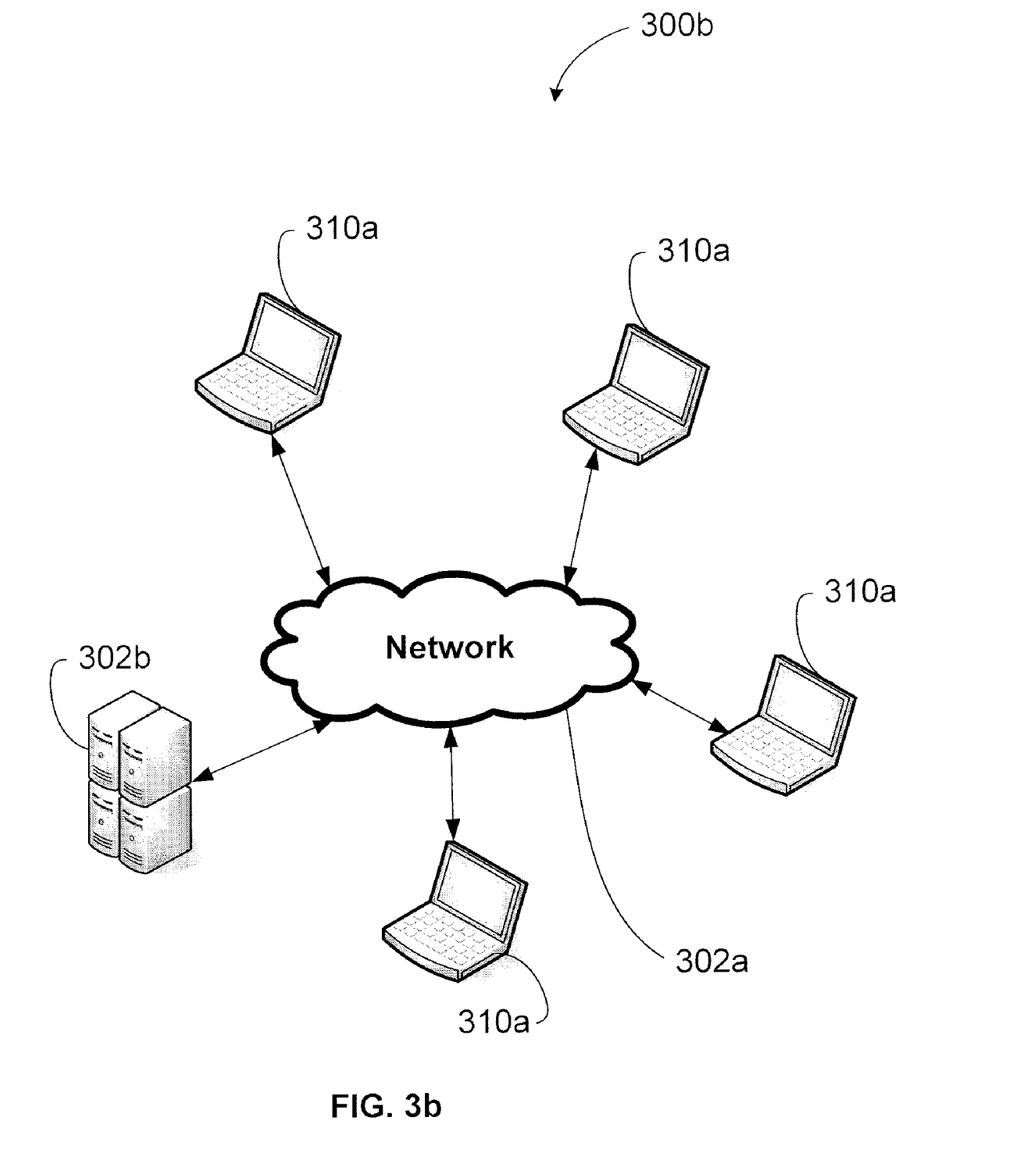
Figure 4:
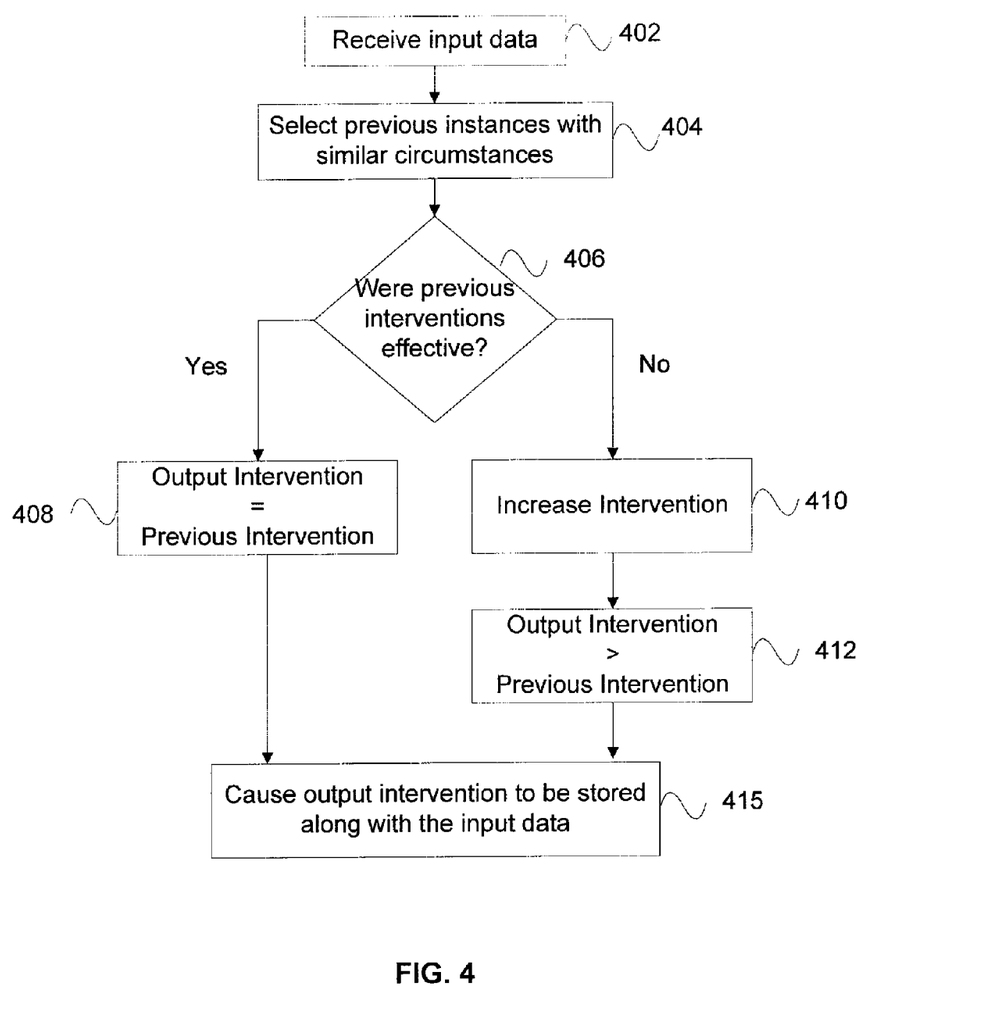
FIG. 4 shows an exemplary set of steps performed to select interventions

At the core of the current disclosure is the determination of interventions (e.g., intervention 220a, 220b, 220c, 220d). Attention is now directed to FIGS. 3 through 4, where exemplary methods, systems, and apparatus for determining interventions are set forth in greater detail.

FIG. 3a and FIG. 3b show exemplary systems 300a, 300b for determining an intervention (e.g., intervention 220a, intervention 220b, intervention 220c, intervention 220d, etc.). System 300a has a computer 302 with computer memory 304, a processor 306, a storage unit 308, and a user interface 310. Storage unit 308 may be, for example, a disk drive that stores programs and data of computer 302, and is shown storing a database 350 and a computer program product 360. System 300b is similar to system 300a, but components are distributed over space. For example, various stations 310a may be included instead of a single user interface 310, and a network 302a and server 302b may "replace" the single computer 302. The server 302b, for example, may include the database 350, though not shown in FIG. 3b, and processors may be included at various locations in the system 300b to function similar to processor 306. It should be understood that portions of the database 350 may be stored in separate locations and that data may be transferred between those locations; the transfer of data is known in the art. Similarly, the computer program product 360 may be included at various (or multiple) locations in the system 300b. While system 300a is generally discussed below, it should be well understood that system 300b may instead be utilized.

Focus is now turned to flowchart 400 in FIG. 4, which shows an exemplary set of steps performed (e.g., by the processor 306 under direction from the computer program product 360) in determining the intervention (e.g., intervention 220a, intervention 220b, intervention 220c, intervention 220d, etc.). At a first step 402, the processor 306 (FIG. 3a) receives input data. The input data may, for example, be contamination level data and/or external indicators (e.g., employee absenteeism, weather patterns/events, lairage time, distance from supplier to plant, chain speed, number of microbial interventions, temperatures, cattle type, employee training programs, mud scores, seasonality, feedyard size, pen size, feedyard ration, wet/dry distiller's grain content in ration, cattle time on feed, carcass/live weight, cattle performance attributes, carcass grade/yield, etc.).

At step 404, the processor 306 selects previous instances with similar characteristics from the database 350. Various acceptable methods may be used to accomplish this. In cases with a single contamination level or external indicator input, this may be as simple as finding cases within a predetermined range of the contamination level or external indicator input in the database 350. And in cases with multiple input data, statistical analysis may be performed on previous input data, previous interventions, and previous actual results, for example, to determine relationships between input data, and the input data that is most statistically relevant may be used to select instance with similar characteristics from the database 350. In selecting previous instances with similar characteristics, the processor 306 may additionally filter the database 350 based on time/season, location, plant, and other narrowing factors.

At step 406, the processor 306 determines if the previous interventions in the previous instances with similar characteristics were effective. This may be done by analyzing the previous instances individually or aggregated; and the user may specify (e.g., through the user interface 310) what qualifies as effective, or this may be preset in the computer program product 360. For example, the user may determine a cutoff line or acceptable range for contamination after the intervention, for improvement, or for disparity between expected and actual results. If the processor 306 determines that a previous intervention was effective, it causes the system 300a to output (e.g., thorough the interface 310) an intervention that should be provided (step 408), and the output intervention is the same as the previous intervention that was effective. If the previous intervention was not effective, the processor 306 increases the previous intervention that was not effective (step 410). This may involve changing the biological, pharmaceutical, and/or other health-promoting substance, or changing the amount of such substance. The processor 306 then causes the system 300a to output (e.g., through the interface 310) an intervention that should be provided (step 412), and the output intervention is increased relative to the previous intervention that was not effective.

At step 415, the processor 306 causes the output intervention (whether from step 408 or step 412) to be stored (e.g., in database 350) along with the input data for future use (e.g., in steps 404 and 406). In addition to determining interventions, the computer program product 360 may perform any required standardizing/normalizing function and compare data across locations, companies, and other relevant groupings to provide a benchmarking function.

Figure 5:
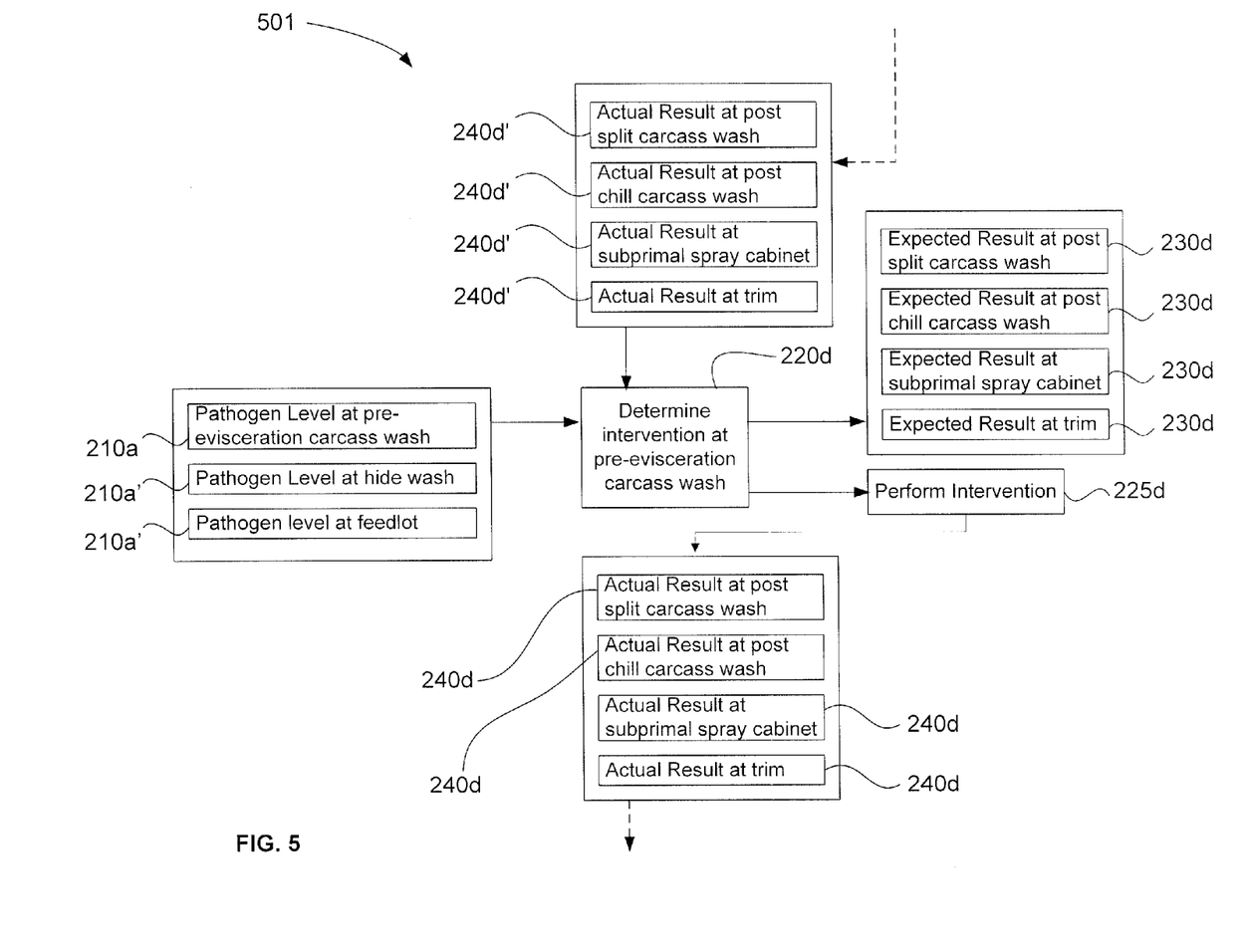
FIG. 5 sets forth an example of the methods for improving protein food safety.

It should be understood that the methods and systems set forth herein may be used with almost any protein source (i.e., live animals and meat, such as beef, poultry, pork, sheep, and goats). FIG. 5 shows an example 501 of the methods and systems in use with beef. More particularly, FIG. 5 shows pathogen levels tested at the pre-evisceration carcass wash 130 (FIG. 1). Traditional testing methods and devices and/or quick test methods and devices (such as, for example, those discussed in *At the Retail/Food Service Level: Quick Test for E. Coli Bacteria*, SafeFood News (Fall 1997 Vol. 2, No. 1), available at http://www.ext.colostate.edu/safefood/newsltr/v2n1s08.html) may be used. In example 501, the system 300 (FIG. 3) is used in accordance with method 200d set forth above, though external indicators 210b are not included.

To determine the intervention 220d in example 501, reference is simultaneously directed to FIGS. 4 and 5. At the first step 402, the processor 306 (FIG. 3a) receives input data 210a, 210a' (e.g., from the user interface 310 or the database 350) that includes pathogen levels at the pre-evisceration carcass wash 130, the hide wash 120, and the feedlot 110 (FIG. 1). At the step 404, the processor 306 selects previous instances with similar characteristics from the database 350, as set forth above. At the step 406, the processor 306 determines if the previous interventions in the previous instances with similar characteristics were effective (e.g., by analyzing previous results 240d'), as set forth in detail above. If the processor 306 determines that a previous intervention was effective, it causes the system 300a to output (e.g., thorough the interface 310) an intervention that should be provided (step 408), and the output intervention is the same as the previous intervention that was effective. If the previous intervention was not effective, the processor 306 increases the previous intervention that was not effective (step 410). This may involve changing the biological, pharmaceutical, and/or other health-promoting substance, or changing the amount of such substance. The processor 306 then causes the system 300a to output (e.g., through the interface 310) an intervention that should be provided (step 412), and the output intervention is increased relative to the previous intervention that was not effective. While different interventions may be used for different protein sources, some examples of interventions for beef at various stages of a beef supply chain include:

| Stage | Exemplary interventions |
|---|---|
| animal rearing location (e.g. ranch/farm) | direct fed microbials; antimicrobials; vaccines |
| feedlot 110 | direct fed microbials; antimicrobials; vaccines |
| hide wash 120 | bacteriophage; chlorine; high pressure water |
| pre-evisceration carcass wash 130 | hot water wash; steam pasteurization; lactic acid; acetic acid; peroxyacetic acid; acidified sodium chlorite |
| post split carcass wash 140 | hot water wash; steam pasteurization; lactic acid; acetic acid; peroxyacetic acid; acidified sodium chlorite |
| post chill carcass wash 150 | lactic acid; acetic acid; peroxyacetic acid; acidified sodium chlorite |
| subprimal spray cabinet 160 | lactic acid; acetic acid; peroxyacetic acid; acidified sodium chlorite |
| trim 170 | lactic acid; acidified sodium chlorite |

As shown at step 225d in FIG. 5, the output intervention should then be performed, and the actual results 240d should be tracked and stored (e.g. in the database 350). Additionally, at the step 415, the processor 306 causes the output intervention (whether from step 408 or step 412) to be stored (e.g., in the database 350) along with the input data for future use.

In the example 501, expected results 230d may be provided by the software product 360 (e.g., through the user interface 310) for the beef item at the post split carcass wash after receiving particular interventions, the expected results 230b for the beef item at the post chill carcass wash after receiving particular interventions, the expected results 230c for the beef item at the subprimal spray cabinet after receiving particular interventions, and the expected results 230d of the beef item at trim. As such, a user may be able to determine the expected results from taking certain actions. For example, if the pathogen level is above a determined level at the pre-evisceration carcass wash, the likelihood of a certain pathogen level (e.g., a pathogen level sufficient to cause a recall) later in the supply chain may be determined if different interventions (including no actions) are taken. In other words, the need for the size and scope of protein food safety interventions throughout the supply chain may be evaluated.

Though not specifically shown in example 501, the system may also perform any required standardizing/normalizing functions and allow users to compare data across locations, companies, and other relevant groupings, as discussed above, to evaluate effectiveness of protein food safety interventions across plants, companies, brands, etc. and/or to provide a benchmarking function.

Those skilled in the art appreciate that variations from the specified embodiments disclosed above are contemplated herein and that the described embodiments are not limiting. The description should not be restricted to the above embodiments, but should be measured by the following claims.

The invention claimed is:

1. A method in a computer system for increasing protein food safety, the method comprising:
   receiving at least one of contamination level data and external indicator data;
   accessing from a database stored data comprising:
      prior contamination level data;
      prior external indicator data;
      prior interventions associated with the prior contamination level data and the prior external indicator data; and
      prior actual results associated with the prior contamination level data and the prior external indicator data;
   selecting a subset of the prior contamination level data, the prior external indicator data, the prior interventions, and the prior actual results, where the prior contamination level data and the prior external indicator data is similar to the at least one of contamination level data and external indicator data; and determining if an effective intervention is set forth in the subset based at least partially on the prior actual results in the subset; and if an effective intervention is not set forth in the subset, causing an intervention to be output that is increased relative to the intervention in the subset.

2. The method of claim 1, wherein:

the receiving comprises receiving a plurality of contamination level data and external indicator data; and the selecting a subset comprises statistically analyzing the prior contamination level data, the prior external indicator data, the prior interventions, and the prior actual results to determine the most relevant prior contamination level data and prior external indicator data, and selecting in accord with the most relevant prior contamination level data and prior external indicator data.

3. The method of claim 1, wherein:

the receiving comprises receiving a plurality of contamination level data and external indicator data; and the determining comprises comparing the prior actual results in the subset, individually and/or aggregated, to at least one benchmark.

4. The method of claim 1, further comprising updating the database to include:

the at least one of contamination level data and external indicator data; and the output intervention.

5. The method of claim 1, wherein causing an intervention to be output that is increased relative to the intervention in the subset is at least one of:

causing an intervention to be output that is a different biological or pharmaceutical substance than the intervention in the subset; and causing an intervention to be output that has a different amount of biological or pharmaceutical substance than the intervention in the subset.

6. The method of claim 1, wherein the external indicator data includes data related to at least one of: employee absenteeism, weather patterns/events, lairage time, distance from supplier to plant, chain speed, number of microbial interventions, temperatures, cattle type, employee training programs, mud scores, seasonality, feedyard size, pen size, feedyard ration, wet/dry distiller's grain content in ration, cattle time on feed, carcass/live weight, cattle performance attributes, and carcass grade/yield.

7. The method of claim 1, wherein:

the receiving comprises receiving a plurality of contamination level data and external indicator data;

the selecting a subset comprises statistically analyzing the prior contamination level data, the prior external indicator data, the prior interventions, and the prior actual results to determine the most relevant prior contamination level data and prior external indicator data, and selecting in accord with the most relevant prior contamination level data;

the determining comprises comparing the prior actual results in the subset, individually or aggregated, to at least one benchmark; and causing an intervention to be output that is increased relative to the intervention in the subset is at least one of:

causing an intervention to be output that is a different biological or pharmaceutical substance than the intervention in the subset; and causing an intervention to be output that has a different amount of biological or pharmaceutical substance than the intervention in the subset.

8. The method of claim 7, further comprising updating the database to include:

the at least one of contamination level data and external indicator data; and the output intervention.

9. The method of claim 1, further comprising causing an intervention to be output that is generally the same as the effective intervention if an effective intervention is set forth in the subset.

10. A method in a computer system for increasing protein food safety, the method comprising:

receiving contamination level data;

accessing from a database stored data comprising:

prior contamination level data;

prior interventions associated with the prior contamination level data; and prior actual results associated with the prior contamination level data;

selecting a subset of the prior contamination level data, the prior interventions, and the prior actual results, where the prior contamination level data is similar to the contamination level data; and determining if an effective intervention is set forth in the subset based at least partially on the prior actual results in the subset; and if an effective intervention is not set forth in the subset, causing an intervention to be output that is increased relative to the intervention in the subset.

11. The method of claim 10, wherein:

the determining comprises comparing the prior actual results in the subset, individually and/or aggregated, to at least one benchmark; and causing an intervention to be output that is increased relative to the intervention in the subset is at least one of:

causing an intervention to be output that is a different biological or pharmaceutical substance than the intervention in the subset; and causing an intervention to be output that has a different amount of biological or pharmaceutical substance than the intervention in the subset.

12. A method in a computer system for increasing protein food safety, the method comprising:

receiving external indicator data;

accessing from a database stored data comprising:

prior external indicator data;

prior interventions associated with the prior external indicator data; and prior actual results associated with the prior external indicator data;

selecting a subset of the prior external indicator data, the prior interventions, and the prior actual results, where the prior external indicator data is similar to the external indicator data; and determining if an effective intervention is set forth in the subset based at least partially on the prior actual results in the subset; and if an effective intervention is not set forth in the subset, causing an intervention to be output that is increased relative to the intervention in the subset.

13. The method of claim 12, wherein:

the receiving comprises receiving a plurality of external indicator data; and the selecting a subset comprises statistically analyzing the prior external indicator data, the prior interventions, and the prior actual results to determine the most relevant prior external indicator data, and selecting in accord with the most relevant prior external indicator data.

14. The method of claim 13, wherein:
the determining comprises comparing the prior actual results in the subset, individually and/or aggregated, to at least one benchmark; and
causing an intervention to be output that is increased relative to the intervention in the subset is at least one of:
causing an intervention to be output that is a different biological or pharmaceutical substance than the intervention in the subset; and
causing an intervention to be output that has a different amount of biological or pharmaceutical substance than the intervention in the subset.

15. The method of claim 12, wherein:
the determining comprises comparing the prior actual results in the subset, individually and/or aggregated, to at least one benchmark; and
causing an intervention to be output that is increased relative to the intervention in the subset is at least one of:
causing an intervention to be output that is a different biological or pharmaceutical substance than the intervention in the subset; and
causing an intervention to be output that has a different amount of biological or pharmaceutical substance than the intervention in the subset.

16. A program storage device readable by a machine, tangibly embodying a program of instructions executable by the machine to perform method steps for increasing protein food safety, the method steps comprising:
receiving contamination level data;
accessing from a database stored data comprising:
prior contamination level data;
prior interventions associated with the prior contamination level data; and
prior actual results associated with the prior contamination level data;
selecting a subset of the prior contamination level data, the prior interventions, and the prior actual results, where the prior contamination level data is similar to the contamination level data; and
determining if an effective intervention is set forth in the subset based at least partially on the prior actual results in the subset; and if an effective intervention is not set forth in the subset, causing an intervention to be output that is increased relative to the intervention in the subset.

17. The program storage device of claim 16, wherein the method steps further comprise causing an intervention to be output that is generally the same as the effective intervention if an effective intervention is set forth in the subset.

18. The program storage device of claim 16, wherein:
the determining comprises comparing the prior actual results in the subset, individually and/or aggregated, to at least one benchmark; and
causing an intervention to be output that is increased relative to the intervention in the subset is at least one of:
causing an intervention to be output that is a different biological or pharmaceutical substance than the intervention in the subset; and
causing an intervention to be output that has a different amount of biological or pharmaceutical substance than the intervention in the subset.

19. A program storage device readable by a machine, tangibly embodying a program of instructions executable by the machine to perform method steps for increasing protein food safety, the method steps comprising:
receiving external indicator data;
accessing from a database stored data comprising:
prior external indicator data;
prior interventions associated with the prior external indicator data; and
prior actual results associated with the prior external indicator data;
selecting a subset of the prior external indicator data, the prior interventions, and the prior actual results, where the prior external indicator data is similar to the external indicator data; and
determining if an effective intervention is set forth in the subset based at least partially on the prior actual results in the subset; and if an effective intervention is not set forth in the subset, causing an intervention to be output that is increased relative to the intervention in the subset.

20. The program storage device of claim 19, wherein:
the determining comprises comparing the prior actual results in the subset, individually and/or aggregated, to at least one benchmark; and
causing an intervention to be output that is increased relative to the intervention in the subset is at least one of:
causing an intervention to be output that is a different biological or pharmaceutical substance than the intervention in the subset; and
causing an intervention to be output that has a different amount of biological or pharmaceutical substance than the intervention in the subset.

* * * * *